United States Patent
Bates et al.

(10) Patent No.: US 6,963,901 B1
(45) Date of Patent: Nov. 8, 2005

(54) COOPERATIVE BROWSERS USING BROWSER INFORMATION CONTAINED IN AN E-MAIL MESSAGE FOR RE-CONFIGURING

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 892 days.

(21) Appl. No.: 09/624,884

(22) Filed: Jul. 24, 2000

(51) Int. Cl.[7] ............................................. G06F 15/16
(52) U.S. Cl. ..................... 709/206; 709/221; 709/248
(58) Field of Search .................. 705/204, 218, 705/221, 248; 709/204–206, 218, 220–222, 709/248, 245–246

(56) References Cited

U.S. PATENT DOCUMENTS

| | | | |
|---|---|---|---|
| 5,944,791 A * | 8/1999 | Scherpbier | 709/218 |
| 6,144,991 A * | 11/2000 | England | 709/205 |
| 6,192,398 B1 * | 2/2001 | Hunt | 709/213 |
| 6,393,462 B1 * | 5/2002 | Mullen-Schultz | 709/206 |
| 6,401,077 B1 * | 6/2002 | Godden et al. | 705/26 |
| 6,434,222 B1 * | 8/2002 | Shaffer et al. | 379/88.13 |
| 6,476,827 B1 * | 11/2002 | Porter | 345/738 |
| 6,477,550 B1 * | 11/2002 | Balasubramaniam et al. | 715/513 |
| 6,487,195 B1 * | 11/2002 | Choung et al. | 370/352 |
| 6,557,028 B2 * | 4/2003 | Cragun | 709/205 |
| 6,571,245 B2 * | 5/2003 | Huang et al. | 707/10 |
| 6,668,273 B1 * | 12/2003 | Rust | 709/204 |
| 2001/0029527 A1 * | 10/2001 | Goshen | 709/218 |

OTHER PUBLICATIONS

Jacobs et al., "Filling HTML Forms Simultaneously: CoWeb—Architecture and Functionality", Fifth International World Wide Web Conference, May 1996, Paris, Fance.*

* cited by examiner

*Primary Examiner*—Saleh Najjar
*Assistant Examiner*—Oanh L. Duong
(74) *Attorney, Agent, or Firm*—Moser, Patterson & Sheridan, LLP

(57) ABSTRACT

The present invention provides a method, apparatus and article of manufacture configured to support sharing of browser information between at least two browser applications. A first browser executing on a first computer generates browser information in response to user input. The browser information is selectively routed to a second computer containing a second browser. The browser information is then used to reconfigure the second browser.

29 Claims, 6 Drawing Sheets ized. For example, browsers often include one or more toolbars, e.g., personal toolbars. Some aspects of such toolbars are configurable by the user. Other configurable features include the colors, fonts, display attributes and the like.

COOPERATIVE BROWSERS USING BROWSER INFORMATION CONTAINED IN AN E-MAIL MESSAGE FOR RE-CONFIGURING

BACKGROUND OF THE INVENTION

1. Field of the Invention

The present invention relates to the information processing field. More particularly, the invention relates to browser programs.

2. Background of the Related Art

Computer networks were developed to allow multiple computers to communicate with each other. In general, a network can include a combination of hardware and software that cooperate to facilitate the desired communications. One example of a computer network is the Internet, a sophisticated worldwide network of computer system resources.

Networks, such as the Internet, require a network browser to enable navigation between network addresses. A browser is an application program or facility that normally resides on a user's workstation and which is invoked when the user decides to access network addresses. A prior art Internet browser program typically accesses a given network address according to a uniform resource locator (URL), i.e., an addressing format. In addition to forwarding and receiving data to and from the network, the browser also processes each type of data which is presented to it. State-of-the-art browsers provide a complete multimedia experience, including video, pictures, 3-D images, sounds and the like.

In addition, browsers provide useful features which facilitate management of the voluminous information encountered by users while browsing. For example, most commercially available Internet browsers (e.g., Netscape's Navigator and Windows' Explorer) provide a history folder containing recently visited network addresses (e.g., web sites) and a bookmark folder to which a user can store network addresses for future retrieval.

In order to accommodate the particular preferences of multiple users, some aspects of browsers are customizable. For example, browsers often include one or more toolbars, e.g., personal toolbars. Some aspects of such toolbars are configurable by the user. Other configurable features include the colors, fonts, display attributes and the like.

In today's pervasive computer environment it is not uncommon for a user to navigate a network from more than one browser program, each located on a different computer. As a result, the browsers used by a single user may have different configurations, settings and other related browser information. Currently, the only method or system available to remedy this condition is for a user to manually reconfigure each browser. Such a procedure is undesirable because of the time involved and the possibility for errors in attempting to synchronize some or all of the browser settings and related information.

Therefore, there is a need for a method, apparatus and article of manufacture to facilitate the configuration of browsers.

SUMMARY OF THE INVENTION

The present invention provides a method, apparatus and article of manufacture configured to support sharing of browser information between at least two browser applications. One aspect of the invention provides a method for sharing user-configured browser information between at least two network browsers configured to communicate the user-configured browser information via a network. The method comprises generating the user-configured browser information during execution of a first network browser on a first computer in response to user-input commands and then transmitting the user-configured browser information via the network to a second computer containing a second network browser, wherein the user-configured browser information is adapted to reconfigure the second network browser. Another aspect provides for a signal-bearing medium containing a program which, when executed by a processor, performs the foregoing method.

Another aspect of the invention provides a method for reconfiguring a first browser located on a first computer. The method comprises parsing user-configured browser information received from a second computer connected to the first computer via a network, wherein the user-configured browser information comprises information generated during execution of a second browser located on the second computer. The method further comprises reconfiguring the first browser according to the user-configured browser information. Still another aspect provides for a signal-bearing medium containing a program which, when executed by a processor, performs the foregoing method.

Yet another aspect of the invention provides an apparatus comprising a first computer comprising a first processor and a first memory containing a first browser program, a second computer comprising a second processor and a second memory containing a second browser program and a network connecting the first and second computer. The network is configured to support transmission of first browser information from the first computer to the second computer. The first browser is configured to generate the first browser information in response to user-input commands and the first computer is configured to send the first browser information to the second computer. The second browser program is then reconfigured according to the received first browser information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

The present invention provides a method, apparatus and article of manufacture configured to support sharing of browser information between at least two browser applications. As used herein, browser, browser application, browser program and the like refer to any program(s) (including associated data structures necessary for operation) configured to navigate between addresses (e.g, network addresses) corresponding to locations of data on a computer or system of computers. The invention has particular application to wide area networks (WANs), such as the Internet, in which browser information is communicated between two or more computers connected by the WAN. However, the invention contemplates embodiments in any network environment. Further, in some embodiments, the invention may be implemented on a single computer comprising two or more browser applications.

In one embodiment, electronic mail (e-mail) is used to communicate the browser information between computers. Such an embodiment is described with reference to the Figures below. However, the invention contemplates any method or system (e.g., file transfer protocol (FTP)) adapted to support the information processing described herein.

Figure 1:
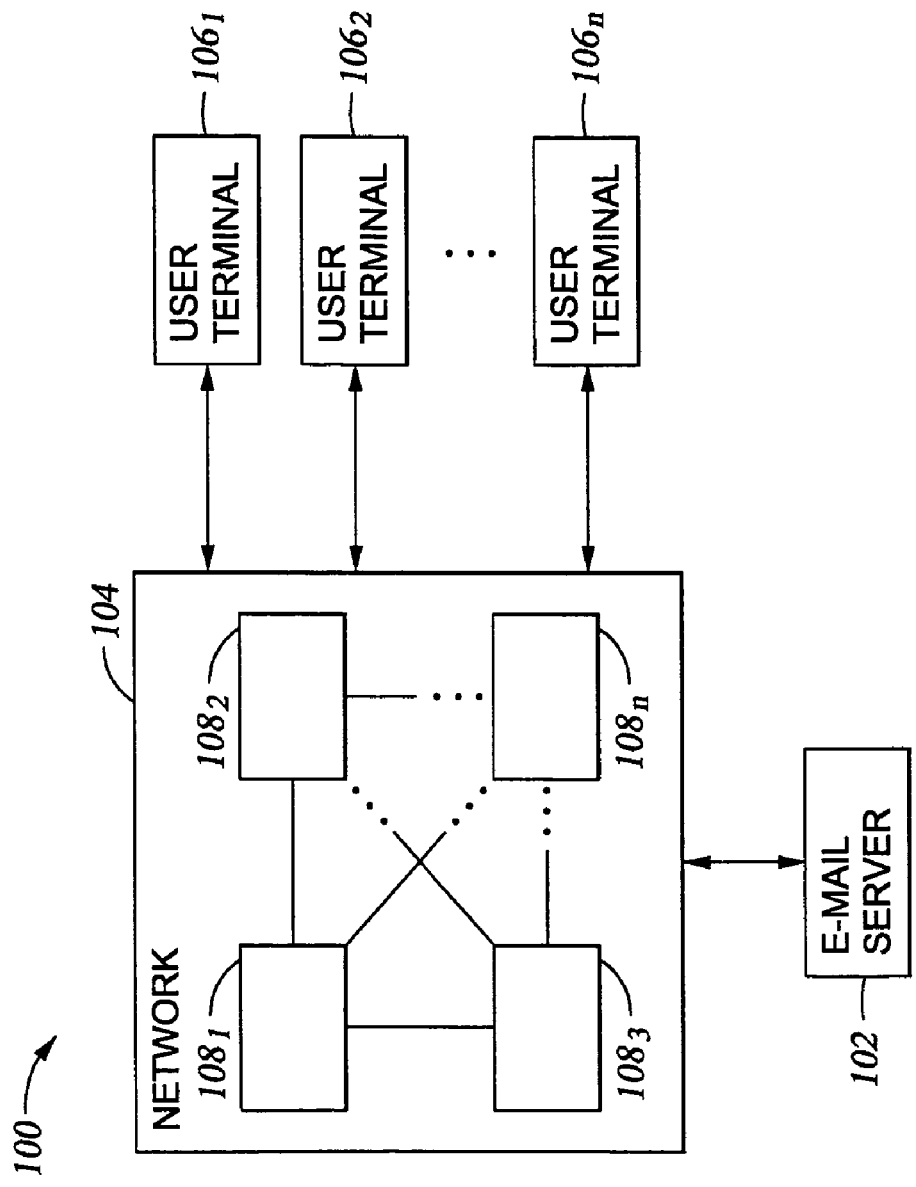
FIG. 1 depicts a simplified block diagram of a network comprising an electronic mail system.

FIG. 1 depicts a networked e-mail system 100 that benefits from the use of the present invention. The system 100 generally represents any networked system including local area networks (LANs) and wide area networks (WANs). The system 100 comprises an e-mail server 102, a network 104 and a plurality of computers (e.g., client computers) $106_1$, $106_2$, ... $106_n$. Each client computer 106 may be a computer system, an e-mail enabled network appliance, an e-mail enabled wireless device and the like. The client computers 106 are connected to one another through the network 104 and also connected through the network 104 to the e-mail server 102. The network 104 may be any system for connecting the client computers 106 and the e-mail server 102 and allowing information exchange therebetween. Illustratively, the network 104 is the Internet and comprises a plurality of network servers 108 (including, for example, hyper text transfer protocol (http) servers). The servers 108 may be accessed according to unique network addresses. One addressing format that may be used to advantage is the Uniform Resource Locator (URL) format, as is known in the art.

The e-mail server 102 provides e-mail services to all of the user client computers 106 such that e-mail addressed from one terminal to another is routed through the network 104 to the e-mail server 102. For example, the e-mail server 102 may be a mail transfer agent (MTA) supporting simple mail transfer protocol (SMTP). Each user client computer 106, acting as a mail user agent (MUA), may then receive its e-mail from the e-mail server 102. The destination MUA is designated according to an email address, as is known in the art. In another embodiment, the e-mail server 102 may transmit e-mail messages to a post office server (e.g., one of the network servers 108 of the network 104). The destination terminal 106 then uses a post office protocol (POP) to retrieve its messages from the post office server. A system using a post office is advantageous in the event the client computers 106 are not continuously ready to receive e-mail, such as when the client computers 106 are PCs that periodically dial in to an Internet Service Provider (ISP). The system 100 shown in FIG. 1 is merely illustrative; other forms of networks may also benefit from the invention.

Figure 2:
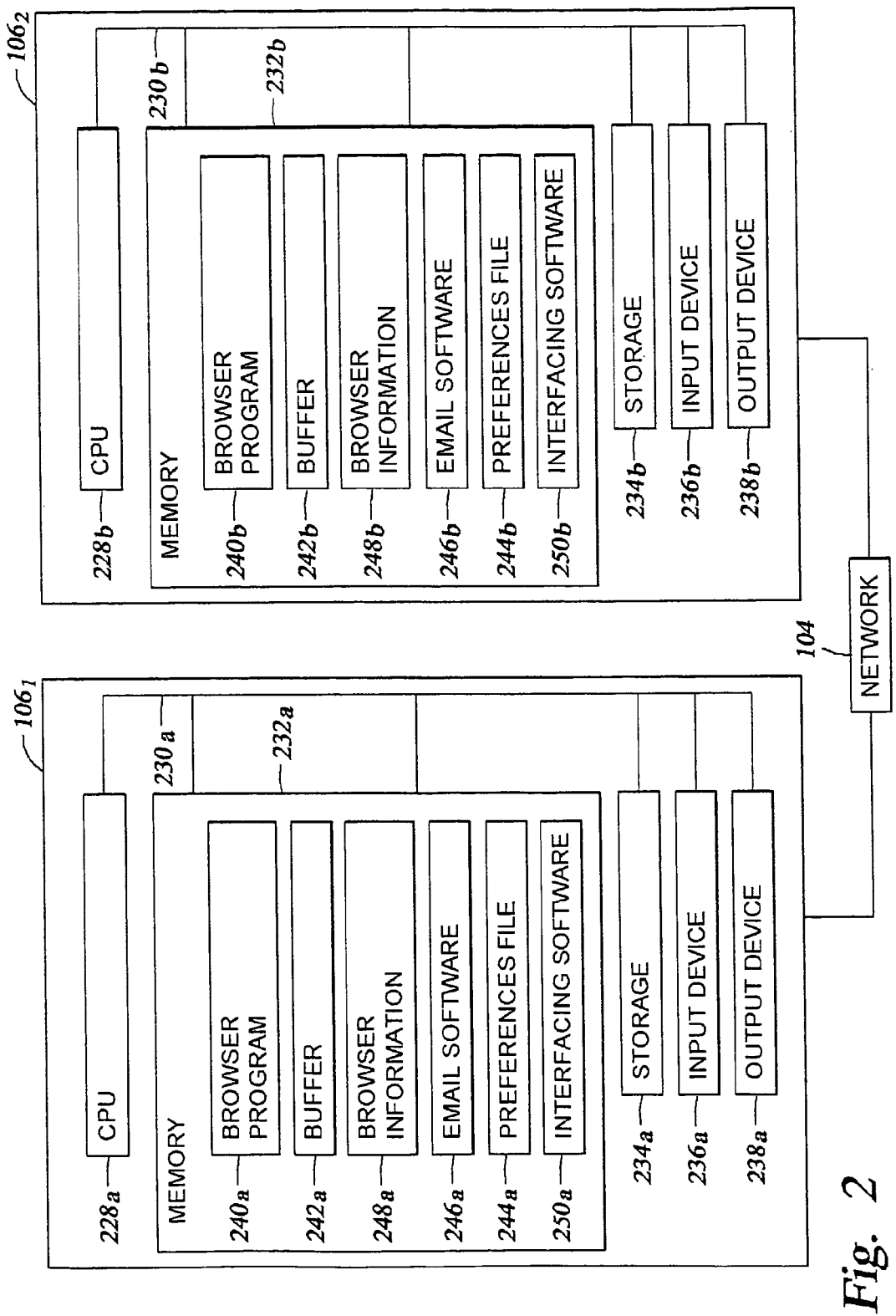
FIG. 2 depicts a simplified block diagram of client computers connected to a network.

FIG. 2 depicts an embodiment of two client computers 106a and 106b, e.g., general purpose computer systems. Each client computer 106 may contain substantially similar components. In general, each client computer 106 includes a Central Processing Unit (CPU) 228 connected via a bus 230 to a memory 232, storage 234, input device 236, and output device 238. The input device 236 can be any device to give input to the client computer 106. For example, a keyboard, keypad, light-pen, touch-screen, track-ball or speech recognition unit could be used. The output device 238 is preferably any conventional display screen and, although shown separately from the input device 236, the output device 238 and input device 236 could be combined. For example, a display screen with an integrated touch-screen, and a display with an integrated keyboard or a speech recognition unit combined with a text speech converter could be used.

Memory 232 is preferably random access memory sufficiently large to hold the necessary programming and data structures of the invention. While memory 232 is shown as a single entity, it should be understood that memory 232 may in fact comprise a plurality of modules, and that memory 232 may exist at multiple levels, from high speed registers and caches to lower speed but larger DRAM chips.

Memory 232 is shown containing a browser program 240, a buffer 242, interfacing software 250, preferences file 244 and e-mail software 246. When executed on CPU 228, the browser program 240 provides support for navigating between the various servers 108 and locating information (e.g., web pages) at one or more of the servers 108. Although only one browser is shown residing on each client computer 106a–b, the invention contemplates computers comprising any number of browsers, which may be other same or varying types. One browser which may be configured to support the present invention is Netscape Navigator®, provided by Netscape Communications of Mountain View, Calif. The information collected by the browser program 240 as well as data related to the operation of the browser program 240 (e.g., user-selected configuration settings) are contained in a browser information data structure 248.

In general, the interfacing software 250 supports communications between otherwise incompatible applications. For example, a browser program 240a residing on a first client computer 106a may be a copy of Netscape Navigator® while a browser program 240 residing on a second client computer 106b may be a copy of Microsoft's Internet Explorer®. In one embodiment, the interfacing software 250 standardizes the format of data input to the buffer 242. Accordingly, browser information transmitted between client computers 106 is applicable to browser programs 240 regardless of the type and version. Although shown residing in memory 232, interfacing software 250 may be any combination of software and hardware which supports interfacing two or more browser programs 240. In addition, the interfacing software 250 may be an integral component of the browser program 240 or may be a separate entity, such as a plug-in.

Buffer 242 is a data structure that can contain browser information. Browser information may be any information related to the browser program 240 and which is to be sent to another client computer 106. In one embodiment, browser information includes information generated during a browsing session, i.e., a period of time when the browser 240 is executing on a client computer 106 and a network connection exists between the client 106 and the network 104 allowing a user to traverse network addresses corresponding to the servers 108. Illustratively, browser information includes cache information (e.g., URLs to sites visited, cookies, etc.), keystroke actions, bookmarks, history list information (i.e., a listing of network addresses visited during the browsing session), browser configurations (e.g., font, color, background, screen sizing, display attributes and other user-configurable settings) and the like.

The preferences file 244 is a data structure containing user-selected configuration parameters indicating what portion of the browser information (contained in the buffer 242) will be shared with a cooperating browser (e.g., executing on one of the client computers 106), when the information will be shared and with which entities (e.g., other client computers) the information will be shared. Establishing the user selected preferences is illustrated below with reference to FIGS. 3-6.

E-mail software 246 is a program that supports transmitting the information contained in the buffer 242 from the client computer 106 to another computer (e.g., another client computer 106) via the network 104. In addition, e-mail software 246 supports receiving browser information from another computer.

Storage 234 is preferably a Direct Access Storage Device (DASD), although it is shown as a single unit, it could be a combination of fixed and/or removable storage devices, such as fixed disc drives, floppy disc drives, tape drives, removable memory cards, or optical storage. Memory 232 and storage 234 could be part of one virtual address space spanning multiple primary and secondary storage devices.

As will be described in detail below, one embodiment of the invention is implemented as a program product for use with a computer system such as, for example, the system 100 shown in FIG. 1. The program(s) of the program product defines functions of the preferred embodiment and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

Figure 3:
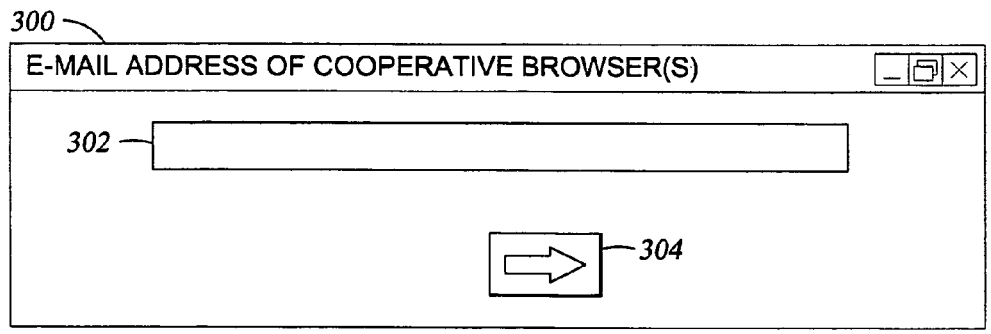
FIG. 3 depicts a data input window for designating one or more cooperating browsers.

FIGS. 3–6 show a series of data input windows for establishing the preferences contained in the preferences file 244. The data input windows may be supported by a graphical user interface (GUI) displayed on the output device 238 (e.g., a computer monitor). FIG. 3 shows a data input window 300 containing an e-mail address field 302. A user may input to the field 302 an e-mail address for a computer (e.g., a remote client computer 106) to which the browser information contained in the sending computer's buffer 242 will be sent. Although only one e-mail address field 302 is shown, the data input window 300 may include two or more such fields to allow the browser information to be sent to multiple computers. Alternatively, multiple e-mail addresses may be input to a single field 302 in the form of a string. Once the desired e-mail addresses are input to the field 302, a user may advance to the next input window by clicking the "forward" radio button 304.

Figure 4:
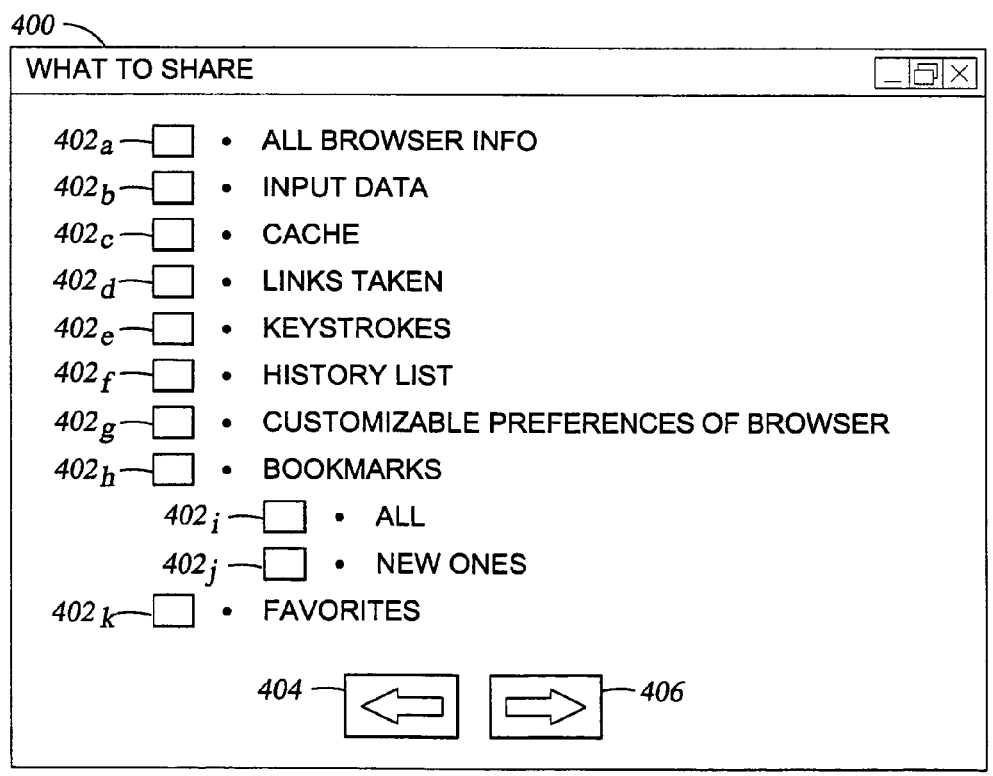
FIG. 4 depicts a data input window for establishing browser information.

FIG. 4 shows a data input window 400 containing a plurality of checkboxes 402*a–k*. Selection of the checkboxes 402*a–k* determines what browser information will be sent/received between two or more client computers 106. Although a single window 400 may be used to established both the sending and receiving preferences, in another embodiment the browser information to be sent is established separately from the browser information to be received using two separate windows.

Checkboxes 402*b–k* each represent an item of browser information. The user may select one or more of the checkboxes 402*b–k*. Alternatively, the user may select checkbox 402*a* entitled "all browser information" which will allow transmission of all browser information contained in the buffer 242. In some embodiments, "all browser information" may be limited to the information generated during a particular browsing session. In other embodiments, "all browser information" may include all browsing information associated with a given browser program, irrespective of the session. In the latter case, all the browser information contained on the sending computer will be contained on the receiving computer subsequent to receipt. Duplicate information may then be deleted to increase the available memory of the receiving computer.

It should be understood that some configurable features (i.e., browser information) such as browser configuration information, user preferences and the like, can be made offline, i.e., without a network connection. Nevertheless, such information is browser information as defined herein.

Selection of the checkbox 402*b* entitled "input data" allows a user to include as browser information data input to a document displayed by the browser program 240. For example, users often input data to an electronic form during an Internet purchase. Such data may include, for example, the user's name, address, telephone number and the like.

Selection of checkbox 402*c* allows a user to include as browser information cache information and cookies. Cache may include, for example, URLs of websites (or, more generally, addresses for any electronic documents) that were accessed by the browser program 240. Caching facilitates subsequent retrieval of the websites. Selection of checkbox 402*c* also includes cookies as browser information. Cookies are well-known in the art and allow a Web server to personalize a web page. Although cache and cookies are included together as items of checkbox 402*c*, in another embodiment each item is separately selectable.

Checkbox 402*d* is entitled "links taken" and refers to hyperlinks activated by the user. Hyperlinks are active areas (e.g., in the form of text or images) on a web page which are associated with a URL of a web page. When clicked on by the user, the browser program 240 retrieves the web page pointed to by the link. Thus, selection of checkbox 402*d* includes as browser information links that were activated (clicked on) by the user.

In the embodiment described above, the cache information (checkbox 402*c*) and the links taken information (checkbox 402*d*) may be in the form of hyper-text-markup-language (HTML) data representing URLs of various web pages (in the case of web-browsers). Upon receipt of the information by a cooperating browser (described in detail below) the URLs can be stored to appropriate data structures for use by the cooperating browser. However, in other embodiments, the information may be formatted as instructions which, when executed, cause the cooperating browser to retrieve the HTML data from the network 104 and then store the data to appropriate data structures. Other browser information discussed herein that represents information accessible from the network 104 may be similarly acquired by the cooperating browser.

In one embodiment, data input window 400 includes a checkbox 402*e* entitled "keystrokes." Keystrokes refers to user input to a keyboard (e.g., input device 236). Thus, selection of checkbox 402e includes as browser information the series of keystrokes provided from the user. The browser information is not limited only to keystrokes and, in other embodiments, may include information from any input device (illustrative input devices 236 are described above with reference to FIG. 2).

Checkbox 402f is entitled "history list." History lists are well-known in browser technology and are generally understood to comprise a list of web pages that have recently been accessed. The list of web pages need not be limited to those sites accessed during a single browsing session.

Checkbox 402g is entitled "customizable preferences of browser." Such preferences include color, sound, finds, display attributes and the like.

Checkbox 402h is entitled "bookmarks." Bookmarks are well known in the browser technology and typically comprise an HTML file of links. A bookmark file may be established upon installation of the browser program 240 and subsequently populated with links to web pages of interest to the user.

As described above, the browser information written to the buffer 242 may be limited to information collected during a single browsing session. In another embodiment, the browser information may include all information related to the browser program 240, irrespective of a particular browsing session. Thus, in one embodiment, checkboxes 402i and 402j allow a user to include as browser information all bookmarks (402i) contained in a bookmark file or only those bookmarks established during a current browsing session (402j), respectively. Each of the other checkboxes 402b–g and 402k may be similarly configured to further define the browser information to be sent/received.

Checkbox 402k is entitled "favorites." A favorites folder is a common browser attribute available with many conventional browsers. The favorites folder comprises one or more Internet shortcuts which, in practice, are similar to bookmarks. A user may select a favorite from a menu, thereby causing the browser program 240 to access the associated URL. Selection of checkbox 402k includes as browser information the contents of a favorites folder (contained in the browser information file 248) associated with the browser program 240.

The selectable browser information identified by the checkboxes 402 is merely illustrative. Other embodiments may include additional browser information.

Figure 5:
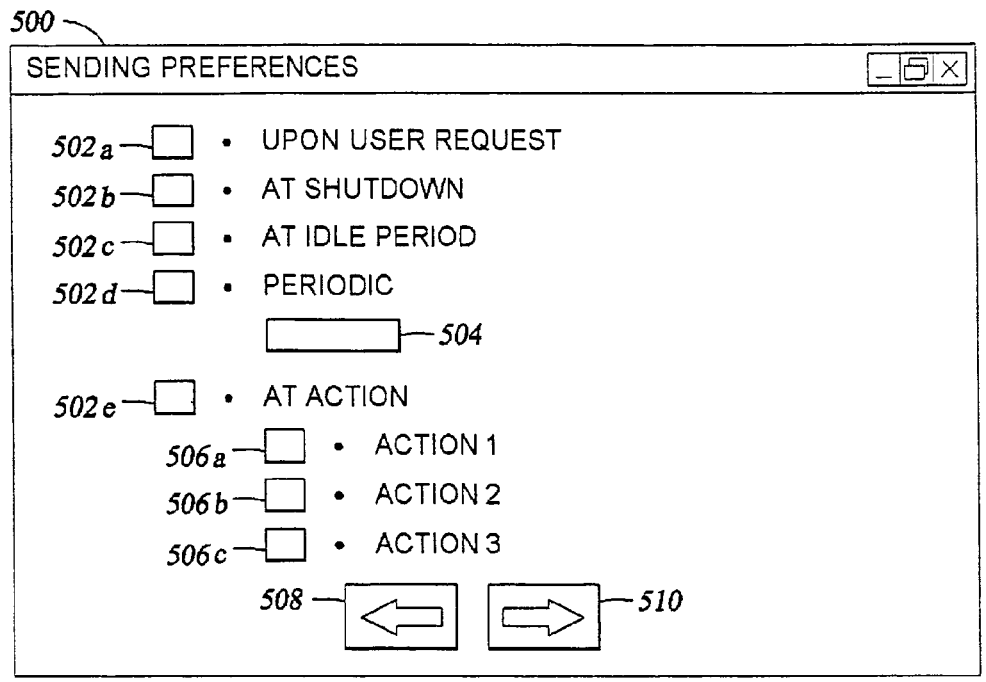
FIG. 5 depicts a data input window for establishing user preferences pertaining to the transmission of browser information.

Upon selection of one or more of the checkboxes 402, the user may return to the previous data input window by clicking on the radio button 404 or may advance to the next data input window by clicking on the radio button 406. If the user clicks on radio button 406, a "sending preferences" window 500 is displayed to the user as shown in FIG. 5.

The window 500 includes a plurality of checkboxes 502a–e which allow the user to select when browser information will be transmitted to a remote client computer 106. A first checkbox 502a is entitled "upon user request" and, when selected, causes the browser information contained in the buffer 242 to be transmitted immediately in response to a user-request. For example, the browser program 240 may include a "send browser information" feature, e.g., in the form of a radio button or menu option. Upon clicking (or otherwise activating) the radio button or selecting the menu option, the browser information contained in the buffer 242 is transmitted via e-mail to one or more cooperating browsers.

If a second checkbox 502b, entitled "at shutdown," is selected, the browser information is transmitted when the client computer 106 is shutdown. If a third checkbox 502c, entitled "at idle period," is selected, the browser information is transmitted when the client computer 106 is idle, e.g., when the computer 106 enters a standby or hibernation mode. A fourth checkbox 502d allows the user to transmit the browser information periodically. For example, the client computer 106 may be configured to transmit the browser information every 30 minutes. The periodic time interval for transmission may be entered into input field 504. A fifth checkbox 502e allows transmission of the browser information to occur at a predetermined action(s), e.g., a keystroke, bookmarking, accessing a web page and the like. The action that causes transmission of the information is designated by the user by selecting one or more of the checkboxes 506a–c. For simplicity, the actions are generically depicted as "Action 1", "Action 2" and "Action 3." In contrast to the user action described with reference to 502a, actions relating to 502e not solely directed to sending the browser information. Instead, the actions relating to 502e have a primary significance other than to transmission of the browser information. Transmission of the browser information is merely associated with such actions as a convenient way of sending the information with requiring additional steps by a user.

Figure 6:
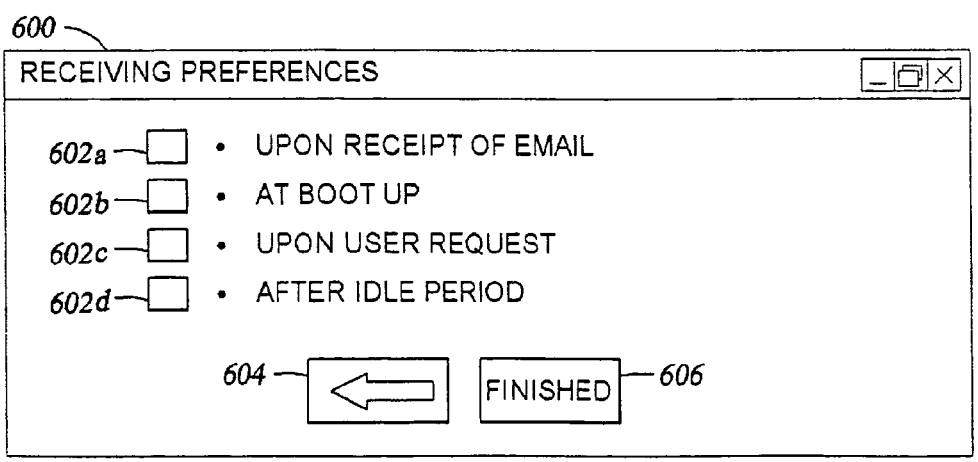
FIG. 6 depicts a data input window for establishing user preferences pertaining to the application of browser information to reconfigure a browser program.

Upon selection of one or more of the checkboxes 502 and 506, the user may return to the previous data input window by clicking on the radio button 508 or may advance to the next data input window by clicking on the radio button 510. If the user clicks on radio button 510, a "receiving preferences" window 500 is displayed to the user as shown in FIG. 6.

The window 600 includes a plurality of checkboxes 602a–d which allow the user to select when browser information received from another computer 106 will be applied to reconfigure a local browser program. Selection of a first checkbox 602a causes the received browser information to be applied upon receipt of an e-mail message containing the information. Selection of checkbox 602b causes reconfiguration when the receiving client computer 106 boots up. Selection of checkbox 602c causes immediate reconfiguration in response to an explicit user action. For example, the browser program 240 may include a "reconfigure browser" feature, e.g., in the form of a radio button or menu option. Upon clicking (or otherwise activating) the radio button or selecting the menu option, the received browser information contained in the buffer 242 of the receiving client computer is applied to reconfigure one or more cooperating browsers located on the receiving client computer. Selection of checkbox 602d causes reconfiguration after an idle period, e.g., such as when the receiving client computer 106 resumes operation after a standby period or hibernation period. Additional or alternative options may also be available to the user. For example, the receiving client computer 106 may be configured to apply the received browser information at periodic time intervals.

Figure 7:
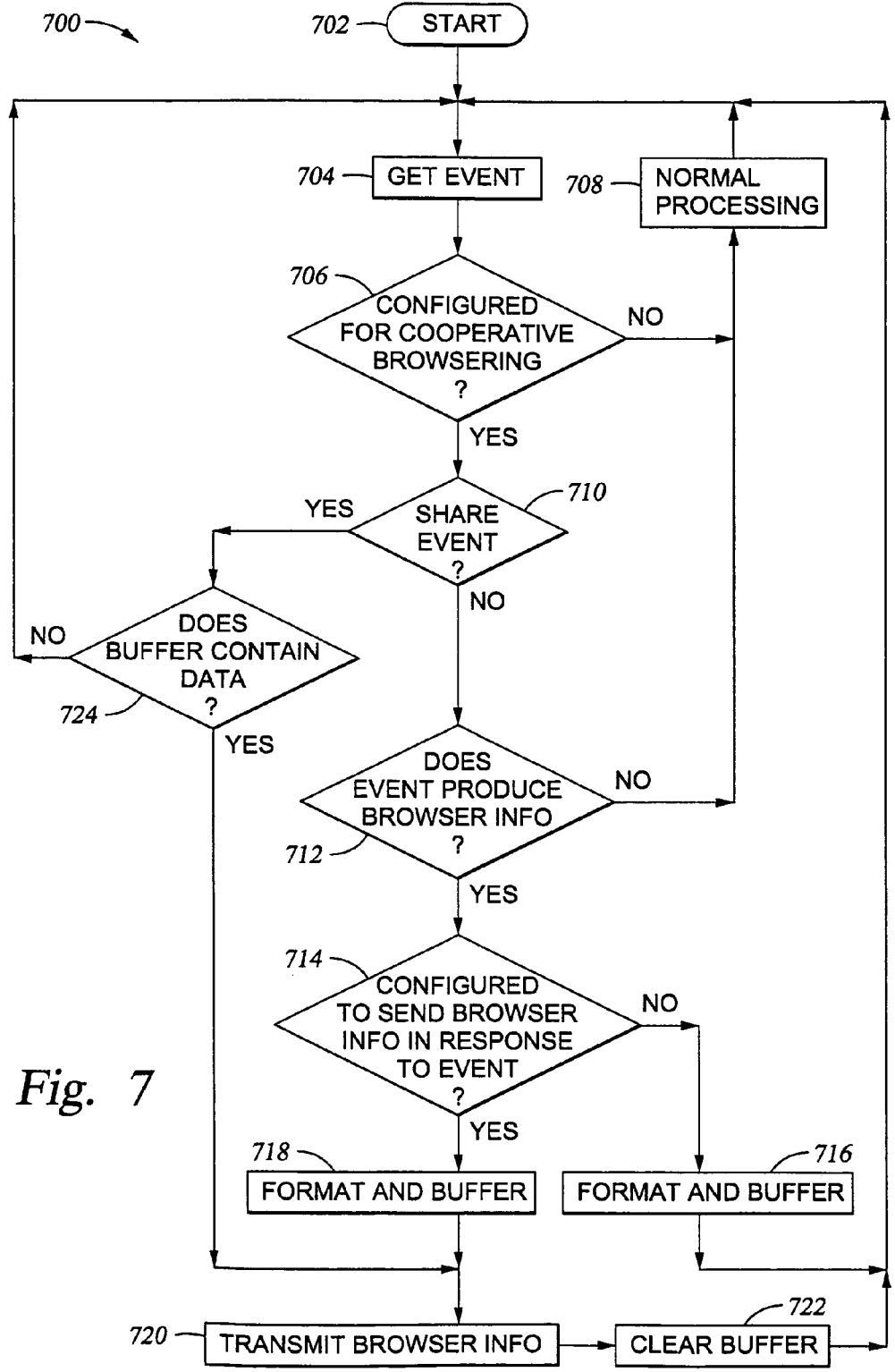
FIG. 7 depicts a flow diagram for generating and transmitting browser information.

FIG. 7 shows a method 700 for operating client computer 106 (referred to herein as the "local client computer" or the "sending client computer") during a browsing session. Method 700 is entered at step 702 and proceeds to step 704 to begin processing an event. At step 706, the method 700 queries whether the local client computer is configured to share browser information with a remote client computer (also referred to herein as the "receiving client computer"). In one embodiment, the determination at step 706 is made according to whether one or more e-mail addresses were input to the address field 302 in the window 300 (shown in FIG. 3). If the local client computer is not configured to share browser information, the method 700 proceeds to step 708 where the event is handled according to normal processing. If the local client computer is configured to share browser information, the method 700 proceeds to step 710 and queries whether the event is a "share event," i.e., an event adapted to initiate transmission of the browser information from the local client computer to the remote client computer. In one embodiment, share events are designated by the user according to selections made in the data input window 500 (shown in FIG. 5).

If the event is not a "share event" than the method 700 proceeds from step 710 to step 712 and queries whether the event produces browser information. The determination made at step 712 is made according to whether any of the checkboxes 402 are selected in the data input window 400 (shown in FIG. 4). If the event does not produce browser information, the event is handled as normal processing at step 708. If the event does produce browser information, the method 700 proceeds to step 714 and queries whether the local client computer is configured to send the browser information in response to the event. If not, the browser information produced by the event is stored to the buffer 242 at step 716. The method 700 then returns to step 704 to begin processing the next event.

If the local client computer is configured to send the browser information in response to the event, the method 700 proceeds from step 714 to step 718 where the browser information is stored to the buffer 242. At step 720, the browser information contained in the buffer 242 is transmitted to the remote client computer via the network 104 and the email server 108 (FIG. 1). In one embodiment, the browser information is sent as an e-mail message. Transmission of the e-mail message is facilitated by the e-mail software 248. Illustratively, the browser information may be included in the body of the mail message or may be sent as an attachment to the message. Once the e-mail message has been sent, the buffer 242 is cleared at step 722 and the method 700 returns to step 704.

If the query at step 710 is answered affirmatively (i.e., the event is a "share event"), then the method 700 proceeds to step 724 and queries whether the buffer 242 contains browser information. During a first iteration of method 700 (i.e., immediately after launching the browser program 240), the buffer 242 will be empty and the method 700 will return to step 704. During subsequent iterations, one or more events may produce browser information that will be buffered at step 716. Following these iterations, step 724 will be answered affirmatively and the method 700 will proceed to step 720 where the information contained in buffer 242 is sent to the remote client computer. The buffer 242 is then cleared at step 722 and the method 700 returns to step 704.

Figure 8:
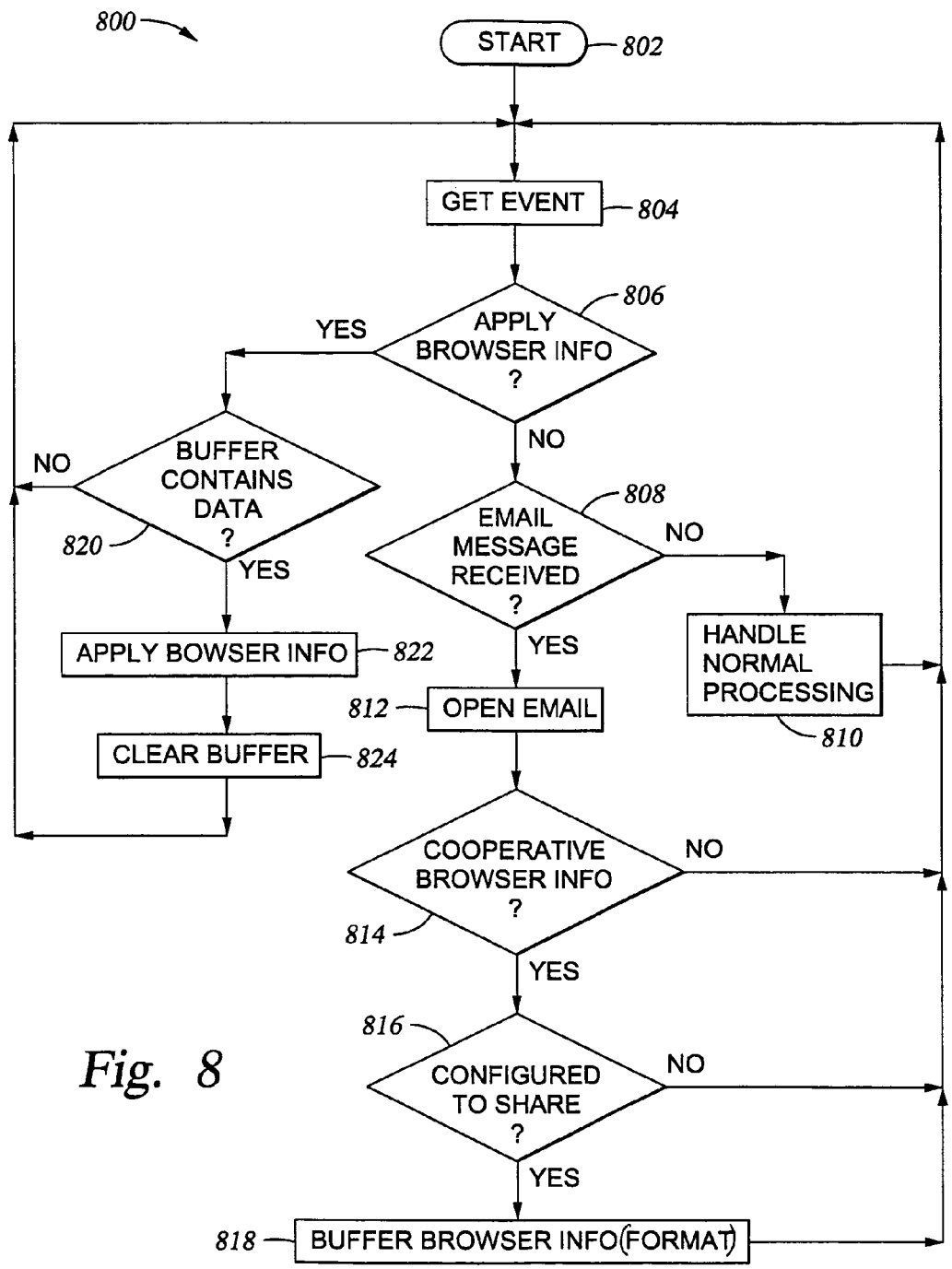
FIG. 8 depicts a flow diagram for handling a received message containing browser information.

At some time subsequent to transmission of the e-mail message containing the browser information (step 720), the message will be received by a remote client computer having the e-mail address designated in the message. The browser information contained in the e-mail message may then be utilized to configure a browser program located on the remote client computer. One embodiment illustrating a method 800 for receiving and applying browser information by a receiving client computer is shown in FIG. 8.

Method 800 begins at step 802 and proceeds to step 804 to get an event. Method 800 then proceeds to step 806 and queries whether the event comprises instructions to apply browser information received from a sending client computer. In one embodiment, the determination at step 806 is made according to the checkboxes 602 selected in data input window 600 (shown in FIG. 6). If step 806 is answered negatively, method 800 proceeds to step 808.

At step 808, the method 800 queries whether the event is the receipt of an e-mail message. In one embodiment, this determination can be made with information provided by the e-mail software 246 executing on the receiving client computer in response to receiving an e-mail message. If step 808 is answered negatively, method 800 proceeds to step 810 where the event is handled as normal processing. Method 800 then returns to step 804 to begin processing the next event.

If step 808 is answered affirmatively, method 800 proceeds to step 812 where the e-mail message is opened by the e-mail software 246. At step 814, method 800 queries whether the received e-mail message contains browser information. In one embodiment, the determination at step 814 is made by processing a control message provided by the sending client computer. The control message may be sent with, or separate from, the e-mail message and contains information recognizable to the CPU of the receiving client computer and indicating that an associated e-mail message contains browser information. In another embodiment, the determination at step 814 can be made with information contained within the e-mail message itself.

If the e-mail message does not contain browser information, method 800 returns to step 804 to retrieve the next event. If the e-mail message contains browser information, method 800 proceeds to step 816 and queries whether the receiving client computer is configured to share the browser information (i.e., reconfigure the browser program 240 located on the receiving client computer). If not, the method 800 returns to step 804. Otherwise, the method 800 proceeds to step 818 where the browser information is stored to a buffer 242 located on the receiving client computer. The method 800 then returns to step 804.

Returning now to step 806, an affirmative determination is made when the event corresponds to a selection made in input window 600 (shown in FIG. 6). In such an event, method 800 proceeds to step 820 where a query is made to determine whether the buffer 242 contains data (i.e., browser information). Prior to receiving a first e-mail containing browser information (determined at step 814), step 820 will be answered negatively. If step 820 is answered negatively, method 800 returns to step 804. If step 820 is answered affirmatively, the browser information contained in the buffer 242 is applied, at step 822, to reconfigure the browser program 240 located on the receiving client computer. Application of the browser information at step 822 may comprise first parsing the information contained in the buffer. Following reconfiguration of the browser program 240, the buffer 242 can be cleared at step 824. The method 800 then returns to step 804.

Subsequent to step 822, the browser program 240 located on the receiving client computer will exhibit each browser attribute and configuration setting transmitted by the sending client computer and applied by the receiving client computer. Accordingly, two or more browser programs may share attributes, settings and other browser information. Such a system can facilitate use of browsers to navigate network environments. For example, consider a user reading messages posted on a bulletin board, inputting data into a web page or performing some other task during a browsing session. Prior to completing the task, the user may be required to terminate a browsing session. In such an event, the necessary browser information may be collected and transmitted to a remote computer containing another browser program. The browser information is then used to reconfigure the browser program of the remote computer and restore the user to where he or she left off during the terminated browsing session. Thus, in the case of a user reading a message board, the browser displays the message which was being read when the browsing session was terminated. In the case of inputting data to a web page, the web page is rendered with the data that was input prior to the termination of the session contained therein. In effect, the present invention preserves the current status of a browsing session to be resumed at another location.

In addition to preserving input data and the browsing history (i.e., the current page, previous pages, links taken, etc.) the invention also preserves changes made to the configuration and user preferences made to a browser. Thus, in one embodiment, two or more browsers may be periodically synchronized to reflect identical features.

As described above with reference to FIG. 2, each client computer may contain two or more browsers. Accordingly, some embodiments may include steps to synchronize specific browsers with respect to one another to determine which browsers will be configured with browser information received from predetermined sources.

Further, the invention is not limited to cooperating browsers of the same type, i.e., from the same vendor, or the same version. For example, a first browser may be the Navigator available from Netscape and a second cooperating browser may be the Internet Explorer available from Microsoft. The two browsers may cooperate despite differences in program structures and data structures. In one embodiment, the interfacing software 250 operates to standardize the format of the buffer contents. Thus, steps 716 and 718 may include steps to convert the browser information to a predetermined format recognizable to a receiving client computer irrespective of the sending or receiving browser type. In one embodiment, formatting of the browser information is performed by the interfacing software 250 (shown in FIG. 2) residing on the sending client computer. The receiving client computer may also include similar interfacing software 250 to process the browser information received from the sending client computer. Illustratively, processing by the receiving client computer may be performed at step 822 (described above with reference to FIG. 8). It is understood that formatting processes may be performed regardless of compatibility between browser types. Thus, methods 700 and 800 can include formatting steps even where the browser programs residing on the sending client computer and the receiving client computer are of the same type and version (e.g., Netscape Navigator, version 6.1). Interfacing two or more applications is well-known in the art. Accordingly, a detailed discussion of interfacing methods and apparatus is not necessary.

The foregoing embodiments utilize a buffer 242 to store browser information collected during a browsing session. The browsing information may then be transmitted (via e-mail) to another computer executing a different browser program. In other embodiments, the use of a buffer is avoided. Instead, the browser information is transmitted directly from persistent files stored on the sending computer. The receiving computer may then apply the browser information to establish the desired browser configuration.

While the foregoing is directed to the preferred embodiment of the present invention, other and further embodiments of the invention may be devised without departing from the basic scope thereof, and the scope thereof is determined by the claims that follow.

What is claimed is:

1. A method for sharing user-configured browser information between at least two network browsers configured to communicate the user-configured browser information via a network, comprising:
   generating the user-configured browser information during execution of a first network browser on a first computer in response to user-input commands;
   specifying, at the first computer, a second computer containing a second network browser as a recipient of the user-configured browser information from the first computer; and
   transmitting the user-configured browser information, via the network, from the first computer to the second computer,
   wherein:
      the user-configured browser information comprises bookmark information and user-preferences information and is adapted to reconfigure the second network browser,
      the user-preferences information comprises display attributes of the first network browser which cause the second network browser to be reconfigured according to the display attributes, thereby causing the second network browser to resemble first network browser on the second computer with respect to said display attributes, and
      said transmitting the user-configured browser information comprises sending an electronic mail message containing said user-configured browser information.

2. The method of claim 1, wherein generating comprises generating input device information representing user input to an input device connected to the first computer.

3. The method of claim 1, wherein generating comprises generating the user-configured browser information during at least one browsing session.

4. The method of claim 1, wherein generating comprises generating favorites information.

5. The method of claim 1, wherein generating comprises generating network addresses for electronic documents accessed during at least one browsing session.

6. The method of claim 1, wherein transmitting comprises sending an electronic mail message containing the user-configured browser information.

7. The method of claim 1, wherein transmitting occurs automatically in response to a predetermined event.

8. The method of claim 1, further comprising reconfiguring the second network browser according to the user-configured browser information.

9. The method of claim 1, further comprising buffering the user-configured browser information prior to the step of transmitting.

10. The method of claim 1, wherein the user-configured browser information further comprises cookies created during browsing sessions using the first network browser.

11. A method for reconfiguring a first browser located on a first computer, comprising:
   receiving an electronic mail message containing a user-configured browser information;
   parsing said user-configured browser information received from a second computer connected to the first computer via a network, wherein the first computer was specified as a recipient of the user-configured browser information at the second computer, wherein the user-configured browser information comprises information generated during execution of a second browser located on the second computer and including bookmark information and user-preferences information, and wherein the user preferences information comprises display attributes of the second browser which cause the first network browser to be reconfigured according to the display attributes, thereby causing the first network browser to resemble second network browser on the first computer with respect to the display attributes; and reconfiguring the first browser according to the user-configured browser information.

12. The method of claim 11, wherein reconfiguring comprises changing at least one of bookmark information, favorites information, user-preferences information and accessed network addresses information stored on the first computer.

13. The method of claim 11, wherein the user-configured browser information further comprises cookies created during browsing sessions using the second browser.

14. A signal-bearing medium containing a browser program which, when executed by a processor, performs a method for sharing user-configured browser information between at least two network browsers configured to communicate the user-configured browser information via a network, the method comprising:

generating the user-configured browser information during execution of a first network browser on a first computer in response to user-input commands;

specifying, at the first computer, a second computer containing a second network browser as a recipient of the user-configured browser information from the first computer; and transmitting the user-configured browser information, via the network, from the first computer to the second computer, wherein:
the user-configured browser information comprises bookmark information and user-preferences information and is adapted to reconfigure the second network browser, the user-preferences information comprises display attributes of the first network browser which cause the second network browser to be reconfigured according to the display attributes, thereby causing the second network browser to resemble first network browser on the second computer with respect to said display attributes, and said transmitting the user-configured browser information comprises sending an electronic mail message containing said user-configured browser information.

15. The signal-bearing medium of claim 14, wherein generating comprises generating input device information representing user input to an input device connected to the computer.

16. The signal-bearing medium of claim 14, wherein generating comprises generating the user-configured browser information during at least one browsing session.

17. The signal-bearing medium of claim 14, wherein generating comprises generating favorites information.

18. The signal-bearing medium of claim 14, wherein generating comprises generating network addresses for electronic documents accessed during at least one browsing session.

19. The signal-bearing medium of claim 14, wherein transmitting comprises sending an electronic mail message containing the user-configured browser information.

20. The signal-bearing medium of claim 14, wherein transmitting comprises sending an electronic mail message containing the user-configured browser information and wherein the user-configured browser information further comprises at least one of favorites information and network addresses.

21. The signal-bearing medium of claim 14, further comprising reconfiguring the second network browser according to the user-configured browser information.

22. A signal-bearing medium containing a browser program which, when executed by a processor, performs a method for reconfiguring a first browser located on a first computer, comprising receiving an electronic mail message containing a user-configured browser information;

parsing said user-configured browser information received from a second computer connected to the first computer via a network, wherein the first computer was specified as a recipient of the user-configured browser information at the second computer, wherein the user-configured browser information comprises information generated during execution of a second browser located on the second computer and including bookmark information and user-preferences information, and wherein the user preferences information comprises display attributes of the second browser which cause the first network browser to be reconfigured according to the display attributes, thereby causing the first network browser to resemble second network browser on the first computer with respect to the display attributes; and reconfiguring the first browser according to the user-configured browser information.

23. The signal-bearing medium of claim 22, wherein reconfiguring comprises changing the contents of data structures of the first browser.

24. The signal-bearing medium of claim 22, wherein reconfiguring comprises changing at least one of bookmark information, favorites information, user-preferences information and accessed network addressed information.

25. A system comprising:

a first computer comprising a first processor and a first memory containing a first browser, wherein the first browser generates first browser information in response to user-input commands and wherein the first computer is configured to send the first browser information to the second computer in response to a user designation of the second computer as a recipient of the first browser information, wherein the first browser information includes bookmark information and user-preferences information;

second computer comprising a second processor and second memory containing a second browser, wherein the second browser is reconfigured according to the received first browser information; and network connecting the first and second computer and configured to support transmission of the first browser information to the second computer, wherein the transmission of the first browser information comprises sending an electronic mail message containing the first browser information, and the user-preferences information comprises display attributes of the first browser which cause the second browser to be reconfigured according to the display attributes, thereby causing the second browser to resemble first browser on the second computer with respect to said display attributes.

26. The system of claim 25, wherein the second memory contains an electronic mail program configured to receive the first browser information.

27. The system of claim 25, wherein the first browser information comprises at least one of favorites information and accessed network addresses information.

28. The system of claim 25, wherein the second computer is configured to generate second browser information in response to user commands input to the second computer and wherein the second browser information is sent to the first browser program via the network and is utilized to reconfigure the first browser program.

29. The system of claim 28, wherein the second browser information comprises at least one of favorites information and accessed network addresses information.

* * * * *